(12) United States Patent  
Bernhardt (10) Patent No.: US 8,172,234 B2
(45) Date of Patent: May 8, 2012

(54) COLLET TOOL HOLDER HAVING ADJUSTABLE AXIS

(75) Inventor: Randall J Bernhardt, Dousman, WI (US)

(73) Assignee: Urban Manufacturing, Inc., Pewaukee, WI (US)

( * ) Notice: Subject to any disclaimer, the term of this patent is extended or adjusted under 35 U.S.C. 154(b) by 323 days.

(21) Appl. No.: 12/231,823

(22) Filed: Sep. 5, 2008

(65) Prior Publication Data

US 2009/0152823 A1    Jun. 18, 2009

Related U.S. Application Data

(66) Continuation-in-part of application No. 11/821,907, filed on Jun. 26, 2007, Substitute for application No. 60/816,458, filed on Jun. 26, 2006.

(51) Int. Cl.
*B23B 31/36* (2006.01)
(52) U.S. Cl. ........... 279/5; 279/137; 269/69; 269/76
(58) Field of Classification Search ......... 279/5, 69, 279/76, 137; 82/155, 156; 409/221, 224; B23B 31/36
See application file for complete search history.

(56) References Cited

U.S. PATENT DOCUMENTS

| | | | | |
|---|---|---|---|---|
| 2,186,236 A * | 1/1940 | Dearborn | ......... | 279/5 |
| 2,233,858 A * | 3/1941 | Tree | ......... | 279/5 |
| 2,445,016 A * | 7/1948 | Bentley | ......... | 269/59 |
| 2,502,260 A * | 3/1950 | Hunziker | ......... | 279/5 |
| 2,621,937 A * | 12/1952 | Hunziker | ......... | 279/5 |
| 2,948,542 A * | 8/1960 | Leifer | ......... | 279/5 |
| 2,998,257 A * | 8/1961 | Wallingford | ......... | 279/5 |
| 3,090,633 A * | 5/1963 | Farnsworth | ......... | 279/5 |
| 3,451,685 A * | 6/1969 | Butler | ......... | 279/5 |
| 3,661,403 A * | 5/1972 | Path | ......... | 279/5 |
| 3,700,228 A * | 10/1972 | Peale | ......... | 269/61 |
| 3,887,202 A * | 6/1975 | Zapart | ......... | 279/5 |
| 3,908,484 A * | 9/1975 | Degen et al. | ......... | 74/813 R |
| 4,529,342 A * | 7/1985 | Babel | ......... | 409/164 |
| 4,568,070 A * | 2/1986 | Severt | ......... | 269/60 |
| 5,174,586 A * | 12/1992 | Saeda et al. | ......... | 279/5 |
| 5,224,716 A * | 7/1993 | Saeda et al. | ......... | 279/5 |
| 5,427,478 A * | 6/1995 | Boucher et al. | ......... | 408/90 |
| 5,501,123 A * | 3/1996 | Swann et al. | ......... | 74/822 |
| 5,520,078 A * | 5/1996 | Hattori et al. | ......... | 82/165 |
| 5,575,488 A * | 11/1996 | Sholly, Jr. | ......... | 279/4.08 |
| 5,964,016 A * | 10/1999 | Ito et al. | ......... | 29/27 C |
| 6,865,788 B2 * | 3/2005 | Pasquetto | ......... | 29/38 B |
| 7,645,103 B2 * | 1/2010 | Schmidt et al. | ......... | 409/168 |
| 2005/0139036 A1 * | 6/2005 | Kato et al. | ......... | 74/813 L |

FOREIGN PATENT DOCUMENTS

DE          3151613 A1 *  8/1982

* cited by examiner

*Primary Examiner* — Eric A Gates
(74) *Attorney, Agent, or Firm* — Ryan, Kromholz & Manion, S.C.

(57) ABSTRACT

A collet assembly for use on a support device comprising a rotatable base section, a support structure secured to the support device, with the support structure supporting the base section on said support device. The base section has a central axis, and the base section is rotatable with respect to the support member and the central axis to a plurality of positions. The collet assembly includes a locking device for locking the base section at one of the plurality of positions.

16 Claims, 9 Drawing Sheets

COLLET TOOL HOLDER HAVING ADJUSTABLE AXIS

RELATED APPLICATIONS

The present invention is a continuation-in-part application of application, U.S. Ser. No. 11/821,907, filed on 26 Jun. 2007, which claims priority to provisional patent application U.S. Ser. No. 60/816,458, filed 26 Jun. 2006.

BACKGROUND OF THE INVENTION

The present invention relates to collet chucks and jaw chucks for holding a tool or work piece on a spindle of a turning machine or similar device, and devices for holding the chucks onto an automatic indexing machines.

Collet chucks are used to clamp or grip work pieces or tools in turning machines, such as lathes. The collet head inside the chuck includes a number of circumferentially-spaced gripping segments and a number of cam surfaces. When the collet head is moved axially, its cam surfaces interact with corresponding opposing surfaces or cams on the mounting fixture. The interaction of the opposing cam surfaces causes the gripping segments of the collet head to expand or contract, thus causing it to grip or release a work piece or tool, depending on the direction of axial movement.

Jaw chucks usually come as three-jaw or four-jaw chucks, which use interconnected dogs or "jaws" on a tool or work piece to hold the tool or work piece in place. Jaw chucks usually are best suited for gripping circular cross-sections.

When either type of chuck is used for machining a tool, it is common to attach the chuck to another stand alone device for proper machining of the tool or work piece. Most previously developed devices are capable of perpendicular machining. That is, these devices are designed for forming holes in the work piece that are either vertically or horizontally aligned with the work piece. Other devices include clamps and the like that are capable of holding the work piece at angles other than right angles. Known devices, though, do not transition easy and precisely from a perpendicular position to another angled position. Many times a user may need to machine one piece at a perpendicular angle and a second piece at a non-perpendicular angle. Furthermore, it is possible that a work piece may need to be machined at different places on the work piece, at both a perpendicular angle and an angle that is not perpendicular to the work piece, while still requiring precise machination. Thus, it would be advantageous to provide a collet holder and assembly that allows for easy and precise changing of the axis for which the machining on the work piece will be performed.

As mentioned, chuck assemblies usually are attached to stand alone devices, such as the previously mentioned indexers, which may take up a larger than desired surface or work area. It would also be advantageous to develop a chuck assembly that could be attached and incorporated into standard table features, such as a standard table top vice.

SUMMARY OF THE INVENTION

The present invention provides a collet holder and assembly that has an adjustable axis for machining that is precisely and accurately designed for rotation between various angled axes. The assembly is preferably designed to hold a collet chuck, but could also be designed to hold a jaw chuck. Further the collet chuck may be arranged to secure a jaw chuck within the collet chuck.

The invention generally comprises a collet assembly that is supported by a work surface. The assembly has a base section, a structure connected to the base section that secures the assembly to the support surface, and a collet connected to the base section. The collet is positionable at a plurality of angles with respect to the support surface and can be securely locked in place at one of the plurality of angles.

The invention is designed so that it can be secured and attached to known standard indexers. Alternatively, the invention may be designed so that it is attached to a standard table-top vice, preferably a six-inch vice.

The present invention further comprises a collet holder that can be rotated to various angles with respect to a central axis so that a collet chuck or jaw chuck can be rotated while being held in the collet holder. The base section of the collet assembly will rotate around the central axis so that a work piece being held by the assembly can be worked on at various angles.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

FIGS. 1-6 show a collet assembly 10 of the present invention being attached to a standard table top vice mount 12 used for machining processes. The assembly 10 generally comprises a main body or base section 14. The base section 14 is supported by support means, which comprises a first support member 16 and a second support member 18, which are preferably manufactured as similarly shaped structures. The support members 16, 18 rest upon the indexer 12. The indexer 12 has a first section 12a slidable with respect to a second section 12b that provide resilience for the support member 16, 18 to secure the assembly 10 in place upon the indexer 12. The support means could take other forms if necessary or desired. As will be shown later with respect to FIGS. 5 and 6, the support means are arranged so that the base section 14 will be able to rotate with respect to the support means and the vice mount, preferably capable of at least approximately 180°, and more preferably being capable of rotating at least approximately 360°, with the capability of rotating in either direction over 360°. However, provided that support means are used that will not inhibit rotation of the base section 14 as described herein, the support means will fall within the scope of the present invention.

Figure 1:
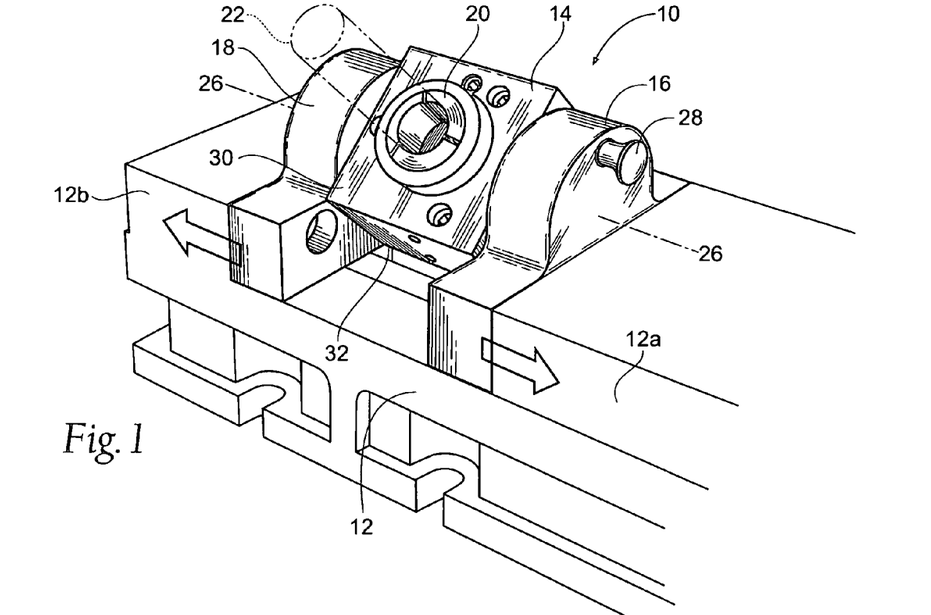
FIG. 1 is a perspective view of an adjustable collet assembly according to the present invention holding a work piece.

Still referring to FIG. 1, the base section 14 supports an adjustable collet 20 that can receive a work piece 22 or other similar tools or objects. As shown in FIG. 1, the base section 14 is angled with respect to the indexer 12. The base section 14 is rotatable around an axis 26, which allows an operator to perform functions on the work piece 22 at angles that are not right angles. The work piece 22 in FIG. 1 is angled at 45° with respect to the mount 12, but other angles are possible. A releasable knob 28 is biased against the support member 16, which provides locking means for the base section 14 in any various angles. The locking means will be further demonstrated further with respect to FIGS. 3A and 3B.

Figure 2:
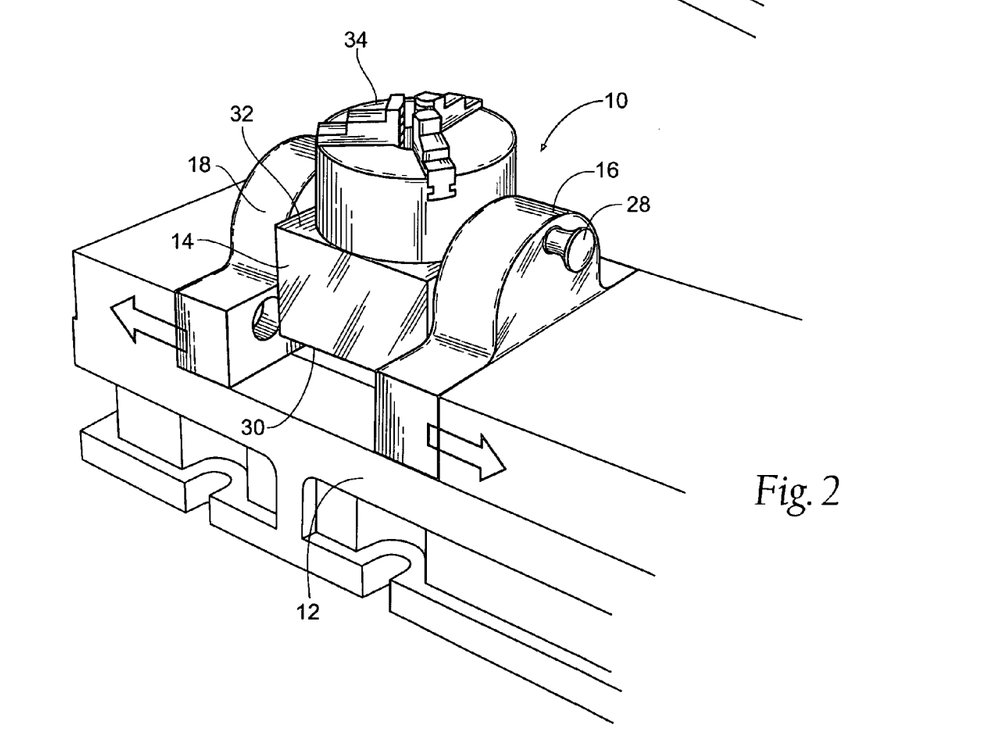
FIG. 2 is a perspective view of the collet assembly of FIG. 1 in a second position holding a jaw-chuck.

As depicted in FIGS. 1 and 2, the base section 14 has a top side 30 and a bottom side 32. The top side is designed to receive the collet 20, as shown in FIG. 1, while the bottom side is designed and arranged to receive a locking jaw 34, as depicted in FIG. 2. The base section 14 is capable of rotating from the position in FIG. 1 to the position in FIG. 2 without the collet assembly 10 needing to be removed from the indexer 12. It is understood that reference to a top side and a bottom side is merely to differentiate the two sides and should not be considered as limiting the scope of the invention to any particular spatial arrangement. The base section 14 is capable of rotating from the position of FIG. 1 to the position of FIG. 2 without needing adapters or other devices.

As discussed above, FIG. 2 provides a perspective view of the assembly 10 having the base section 14 in a second position from that of FIG. 1. The knob 28 will be pulled outwardly, which will unlock the base section 14 from the support member 16, thereby allowing the base section 14 to be rotated. The locking jaw 34 is then attached to the base section 14, and the assembly can be used, as necessary.

Figures 3A, 3B:
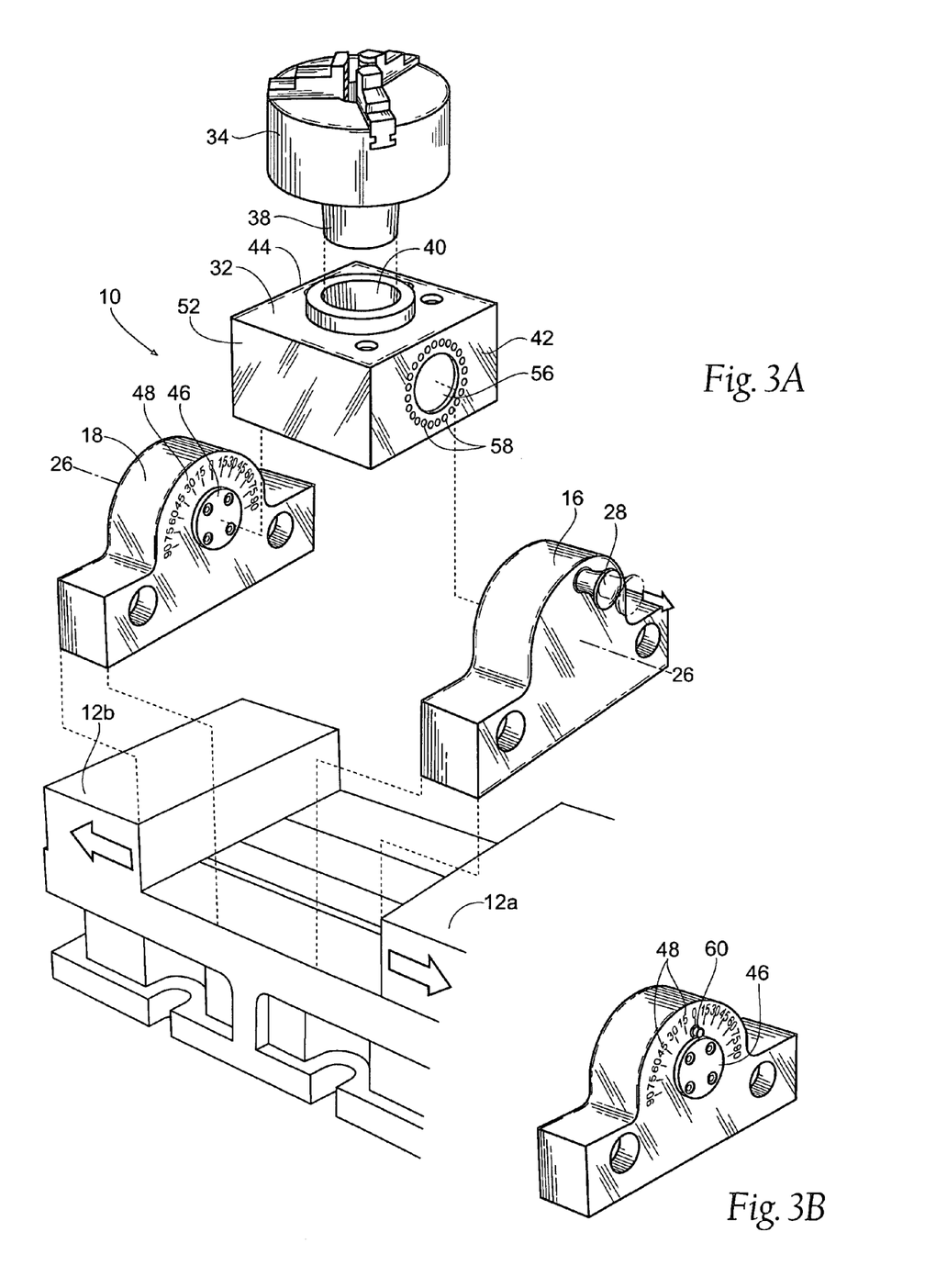
FIG. 3A is an exploded view of the collet assembly of FIG. 2 in a second position.
FIG. 3B provides a perspective view of a support member used with the collet assembly of the present invention.

FIG. 3A shows an exploded view of the assembly 10, as arranged in FIG. 2. The locking jaw 34 comprises a male insert section 38 that is inserted into an opening 40 located on the bottom side 32 of the base section 14. It should be understood that the opening 40 is generally considered as a collet, but is referred to as an opening to distinguish it from the collet 20. Any arrangement that can removably receive and secure an outside object, such as a work piece, jaw chuck, or other similar device as understood in the art, should be considered as a collet within the scope of the present specification and invention. The locking jaw 34 will be secured in place by adjusting the collet 20 (see FIG. 1) so that it properly retains the insert section 38. As noted above, the base section 14 is supported by the support members 16 and 18. The base section 14 comprises a first side 42 and a second side 44, with each of the sides 42 and 44 mating with a respective support member 16, 18. The sides 42 and 44 are preferably designed as relatively symmetrical with one another so that the base section 14 is properly supported by the support members 16, 18. As such, reference to elements of one of the sides 42 and 44 and of the support member 16, 18 will be understood to refer to the other side or support member, as well, unless otherwise noted.

As previously shown and stated, the assembly 10 is secured to the indexer 12. The first section 12a of the indexer 12 is slid outwardly from the second section 12b so that the assembly 10 is placed in the cavity formed by the first and second sections 12a, 12b. The first support member 16 is placed against the second section 12b, with the base section 14 being secured to the support member 16 at any desired angle. The support members 16, 18 may contain markings 48 so that a person can easily align the base section 14 with a desired position. The support member 18 is then secured to the base section 14, and the first section 12a of the indexer 12 is slid inwardly to hold the assembly securely in place. Once the assembly 10 is secured in place, the assembly 10 can be moved to another position if necessary.

Still referring to FIG. 3A, each of the support members 16, 18 has a mating section 46 that generally comprises a circular or cylindrical shape. The mating sections 46 will mate with a respective recessed area 52 located on the first side 42 and the second side 44 of the base section 14. The recessed area 52 is shaped to matingly attach to the mating section 46, while allowing rotation of the base section 14. The mating section 46 and the recessed area 52 could be of other shapes or designs, but the cylindrical shape allows for the interaction of the base section 14 to rotate evenly around the axis 26 with respect to the support members 16, 18.

Referring to FIGS. 3A and 3B, the locking arrangement is demonstrated more clearly. The base section 14 comprises a plurality of indents 58, which are circularly arranged around the central axis 26, preferably evenly spaced apart. The indents 58 are locate outside of the mating section 46 and the recessed area 52, but could be locate within these areas, as well. The indents 58 allow indexing of the base section 14 when it is rotated, which assists in locking and arranging the base section 14 at various angles with respect to the indexer 12. The knob 28 (FIG. 3A) is connected to a pin member 60, which is arranged to intersect one of the indents 58 to secure the base section 14 at a selected angle. When the knob 28 is pulled outwardly from the support member, the pin member 60 will move inwardly towards the support member and disengage from one of the indents 58, thereby allowing the base section 14 to be rotated. The knob 28 is preferably biased against the support member 16, so that the pin member 60 normally will return to a locking position with one of the indents 58 if there is no external pressure on the knob 28, thereby preventing the base section 14 from loosely rotating when moving from one angle position to a secondary position, or from rotating from one position to another when the assembly 10 is in use. There can be more or fewer indents than shown, depending on the desired specificity of the angles that is required for the assembly 10. Preferably, the detents 58 will be arranged so that the various angles for the base section 14 are 15° apart, which are typical angles used in the art. Likewise, other locking means could be used, such as clips, screws, braces, or similar devices and the arrangement would still fall within the scope of the invention.

Figures 4, 5:
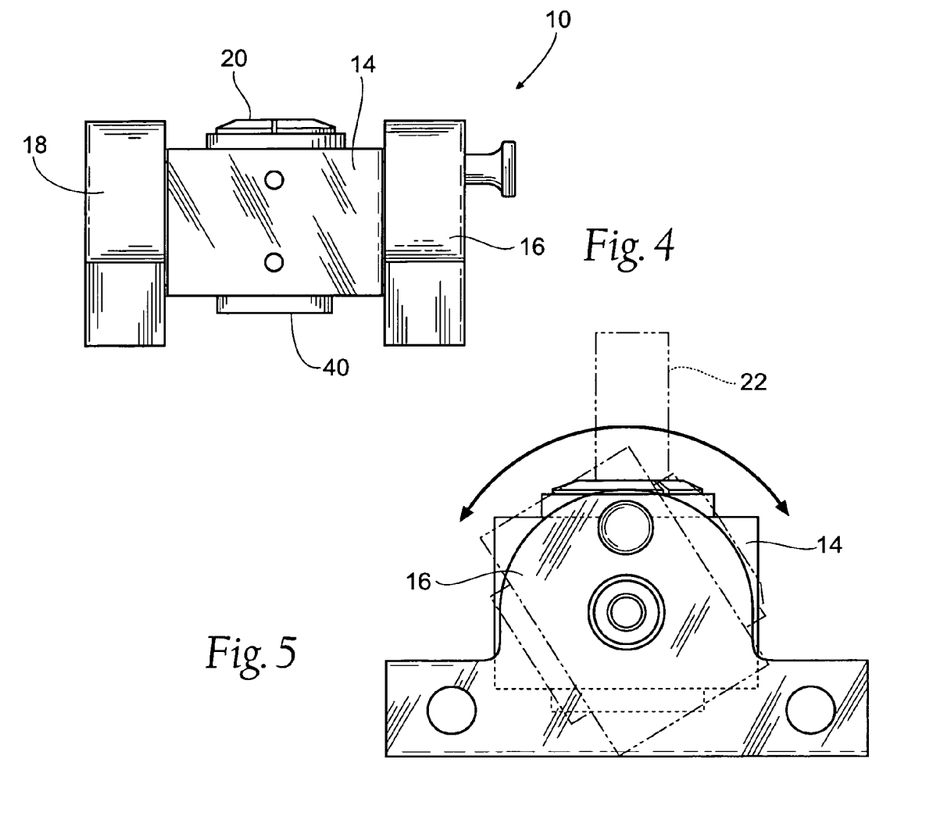
FIG. 4 is a front elevation view of the collet assembly shown in FIG. 1.
FIG. 5 is a side elevation view of the collet assembly as shown in FIG. 1 depicting rotation to an alternate position.

Referring to FIG. 4, a rear elevation view of the assembly 10 is shown. As previously noted, the base section 14 is supported by the support members 16 and 18. The base section 14 is elevated with respect to the bottom of the support members 16 and 18, which allows room for the base section 14 to rotate. In the position shown in FIG. 4, the collet 20 is facing upwardly of the base section 14, thereby allowing the collet 20 to be used to grab a work piece 22 (see FIG. 1). The opening 40, which may receive a locking jaw 34 as shown in FIG. 2, is facing downwardly and is not utilized in the arrangement of FIG. 4. However, it is understood that the opening 40 and the locking jaw 34 could be utilized by rotating the base section 14 to an alternate position (i.e. FIG. 2).

Figure 6:
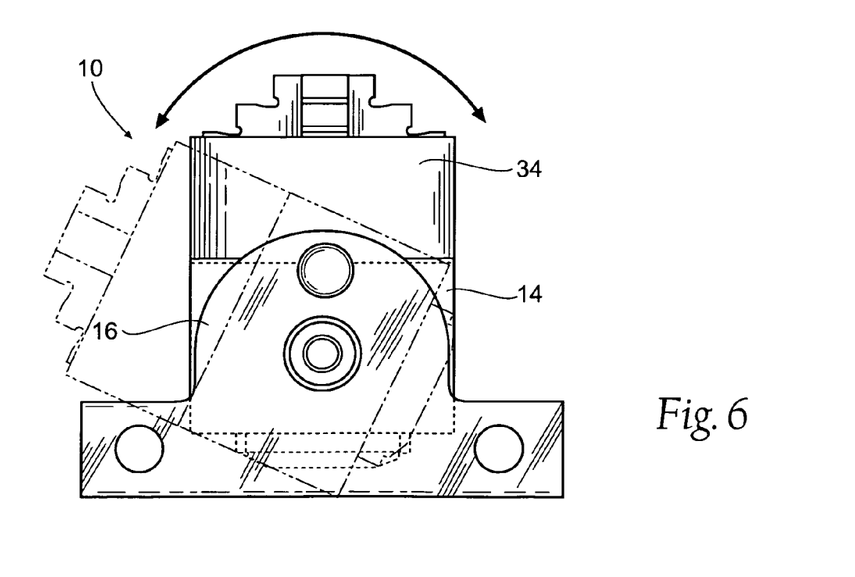
FIG. 6 is a side elevation view of the collet assembly of as shown in FIG. 2 depicting rotation to an alternate position.

For example, FIGS. 5 and 6 demonstrate the base section 14 being rotated with respect to the support members 16, 18. FIG. 5 depicts the work piece 22 secured by the base section 14 and being rotated between various positions, while FIG. 6 depicts the jaw 34 secured by the base section 14 and being rotated between various positions. If the base section 14 is to be rotated from the position in FIG. 5 to the position in FIG. 6, the work piece 22 and/or the jaw 34 would be removed. While it is possible to design the support members 16 and 18 to accommodate rotation with the work piece 22 and/or the jaw 34 still attached, such an arrangement would not provide the most efficiently balanced structure for machining purposes.

When comparing FIGS. 1-6, it can be seen that the assembly 10 may be secured at varying angles. For instance, FIG. 1 shows the assembly 10 secured at a 45° angle with respect to the mount, FIG. 2 shows the assembly secured at a 90° angle to the mount 12, and FIG. 6 shows the assembly 10 secured parallel to the mount 12. The base section 14 is preferably capable of rotating 360°, but it is possible that the assembly 10 will be designed so that the base would potentially rotate less, such as 180°.

FIGS. 7-10 depict a second embodiment 110 of the collet assembly of the present invention attached to an automatic indexer 112. The indexer 112 and the vice 12 (FIG. 1) can generally be referred to as support devices. Typical indexers are designed and manufactured by Hardinge, Inc. and Haas Automation, Inc., among other companies. The present assembly 110 is preferably designed to be easily secured to these standard indexers without the need for adapters or other devices. As with the assembly 10, the assembly 110 comprises a base section 114 that is supported by a support member 116, which connects the base section 114 and the assembly 110 to the indexer 112. The assembly 110 is also capable of supporting a work piece 22 held in place by a collet 120 (FIG. 7) or a jaw chuck 34 (FIG. 8), as with the previous embodiment.

Figure 7:
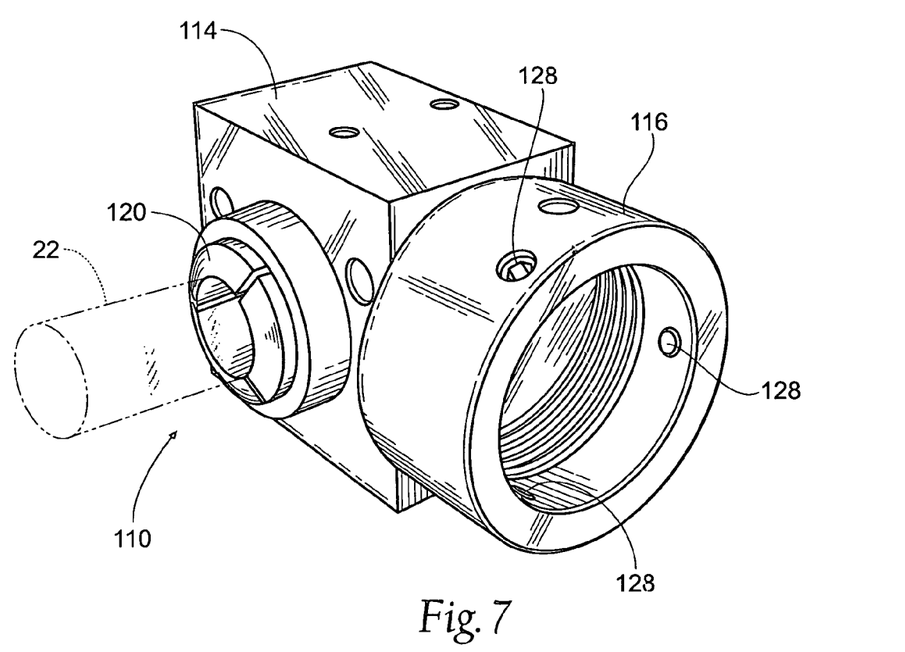
FIG. 7 is a perspective view of a second embodiment of a collet assembly in accordance with the present invention.
Figure 8:
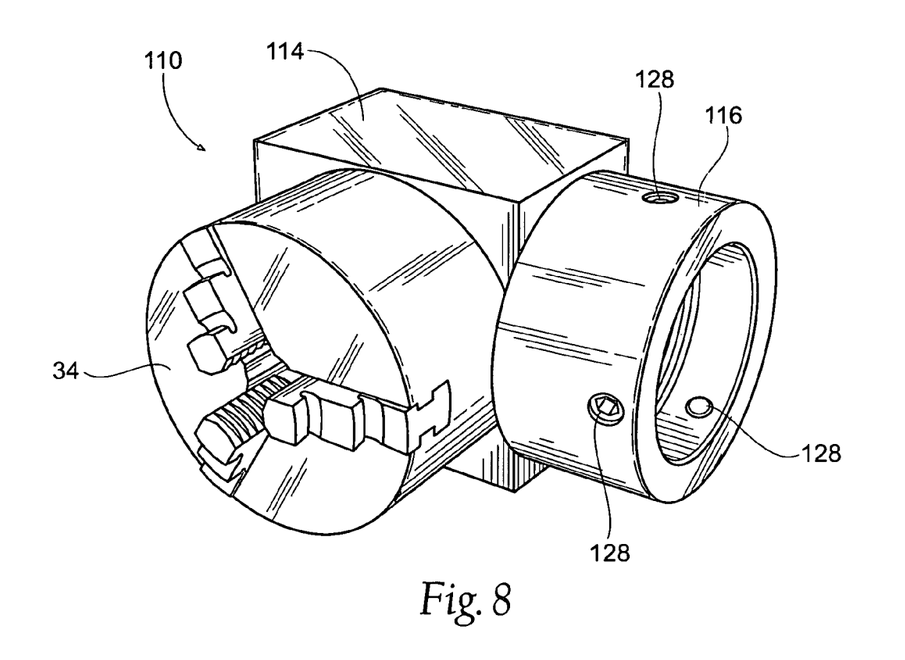
FIG. 8 is a perspective view of the collet assembly of FIG. 7 supporting a jaw chuck.
Figure 9:
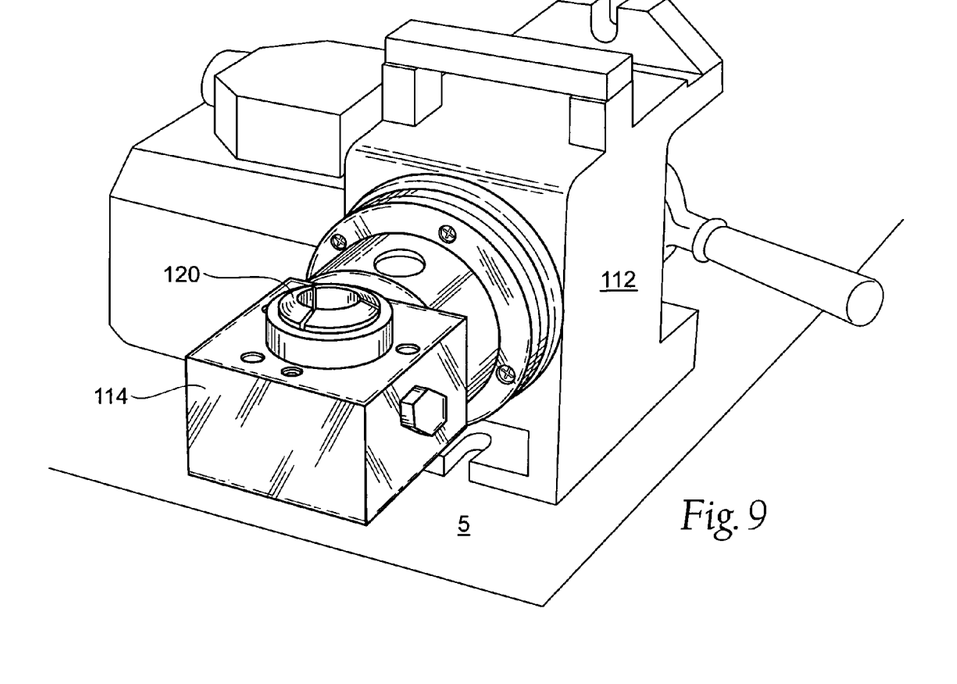
FIG. 9 is a perspective view of the collet assembly of FIG. 7 being mounted on an indexer.
Figure 10:
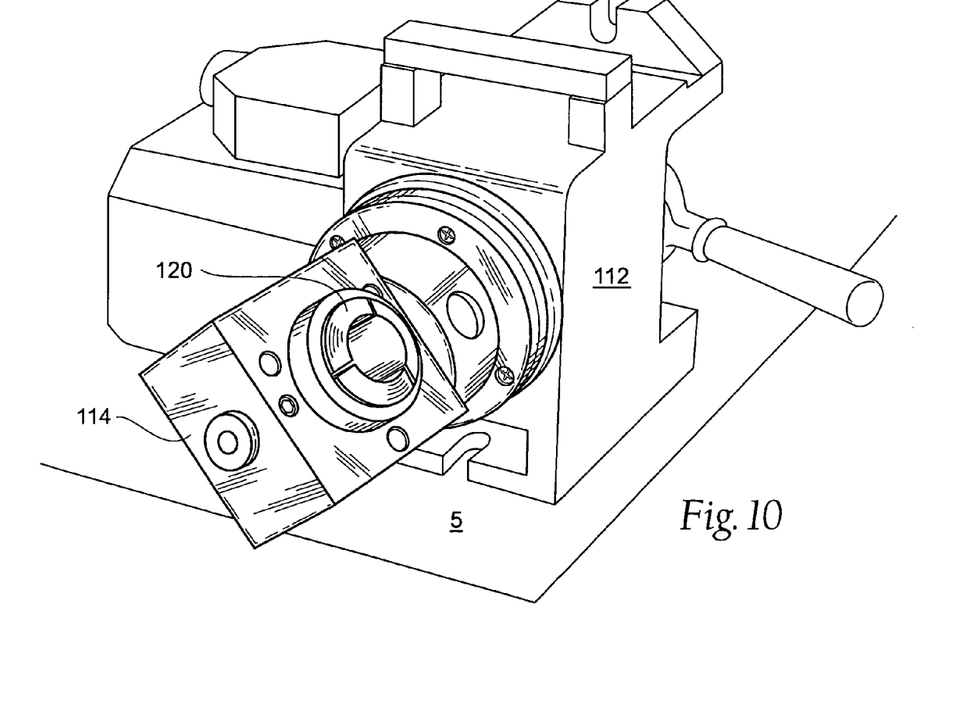
FIG. 10 is a perspective view of the collet assembly of FIG. 9 in a second position.

FIGS. 9 and 10 demonstrate the ability for the assembly 110 to rotate so that the base section 114 can rotate relative to the support member 116. FIG. 9 positions the base section 114 at a parallel position with respect to a surface 5, while FIG. 10 shows the base section 114 at a 45° angle with respect to the surface 5. As shown in FIGS. 6 and 7, the assembly 110 uses a plurality of set screws 128 to provide locking means for the assembly 110 at these various positions and other positions. The set screws 128 are threadingly secured onto the support member 116 and are tightened or loosened to allow the base section 114 to be secured or rotated relative to the support member 116. The assembly 110 and the set screws 128 demonstrate further that various locking means can be used to rotatably secure the base section 114 at various angles.

As with the assembly 10, the assembly 110 is capable of rotating 360°, and the assembly can be set locked at any various angle.

The present invention provides an adjustable collet assembly that can be easily incorporated to work with common equipment and machinery. No previously known adjustable device could be incorporated to work with a table vice, indexer, or other support device, as the present invention is capable of doing. The invention is precisely machined and preferably made of cast iron, which allows the assembly to be a durable tool, as well.

Figure 11:
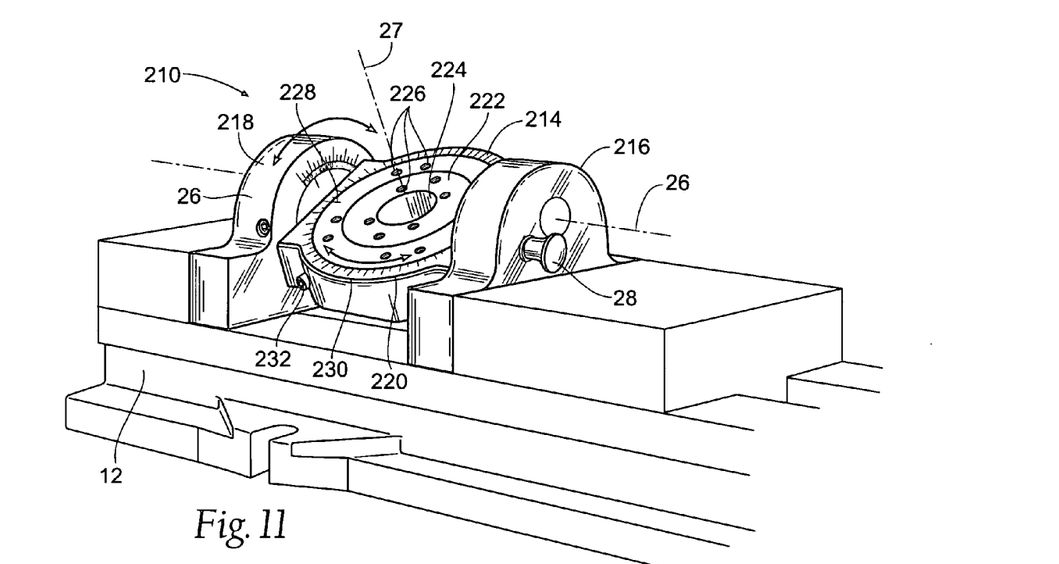
FIG. 11 is a perspective view of a further embodiment of the present invention, having a collet holder that is rotatable around a central axis.

The present invention also provides an adjustable collet assembly that can be rotated in a secondary plane or around a secondary axis, as well. FIG. 11 shows a collet assembly 210 having such an arrangement. The collet assembly 210 is shown being situated upon the vise mount 12, as was the previous embodiment of the collet assembly 10. The assembly 210 has a base section 214 that is supported by a first support member 216 and a second support member 218. The base section generally comprises an outer section 220 and an inner section 222, with the inner section 222 being rotatable with respect to the outer section 220. The inner section 222 has an opening 224 that is sized to receive a collet, jaw, chuck, adaptor, or other device commonly used in the industry. The base section 214 further has a plurality of indents 226 that are arranged so that any of various common devices can properly mate with the base section 214.

Still referring to FIG. 11, the base section 214 is capable of rotating around the axis 26 as previously described with respect to the collet assembly 10. The base section 214 is also capable of rotating around a second axis 27, preferably being capable of rotating 360° around the axis 27 in either direction. As noted above, the inner section 222 rotates with respect to the outer section 220. The inner section 220 has an indicator 228 on it that can be aligned with markings 230 located on the outer section 220 so that the inner section can be rotated and aligned to a specific measurement or angle. A set screw 232 located on the outer section 220 is used to secure the inner section 222 to the outer section 220 when a specified angle is reached. Alternative securing means can be used to secure the two sections 220 and 222 in a fixed relation with one another. For example, a knob, similar to the knob 28 previously described for holding the base section 214 in place with respect to the upright members 216 and 218, could be used to hold the two section 220, 222 in a fixed relation with one another, or the knob 28 could be used to fix the collet assembly 210 in place with respect to both axis 26 and 27.

Figure 12:
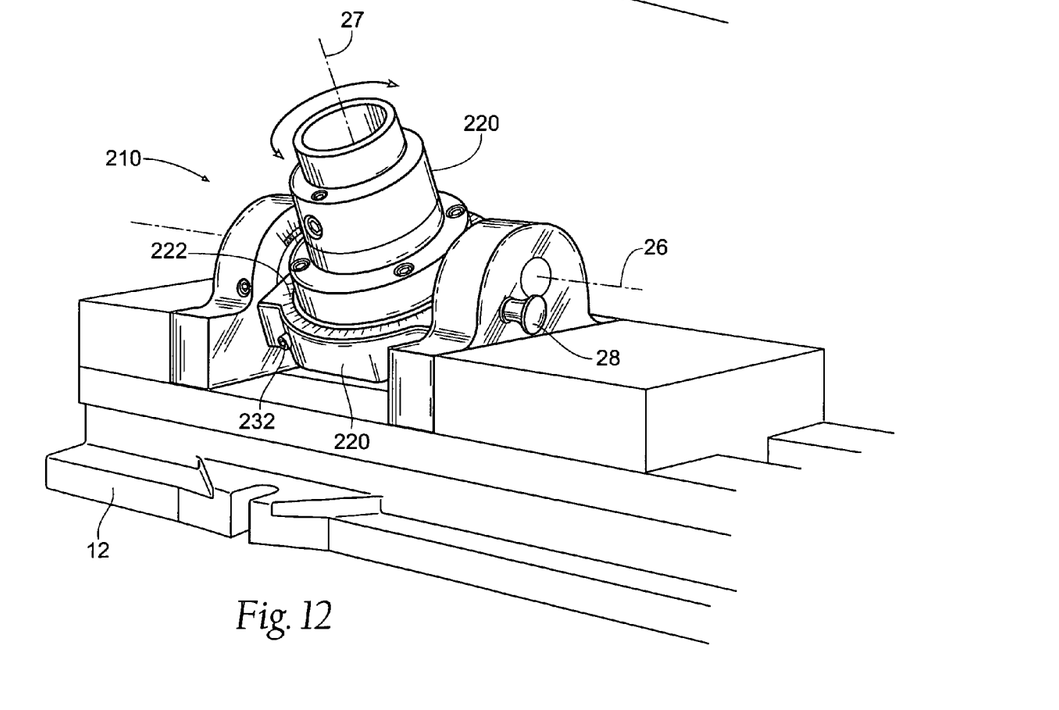
FIG. 12 is a perspective view of the embodiment of FIG. 11, with the rotatable collet holder holding a collet chuck.

Referring to FIG. 12, the assembly 210 is shown supporting the collet 20. The collet 20 is mated with the inner section 222, and is then rotated with respect to either axis 26 or 27 or both. The knob 28 and the set screw 232 are then used to secure the base section 214 in a fixed position with respect to the vice mount 12 and the collet assembly 210, in general. The collet, jaw, or other device mounted on the base section 214 can be rotated 360° with respect to either axis 26 or 27 and be locked in place at the desired position.

Figure 13:
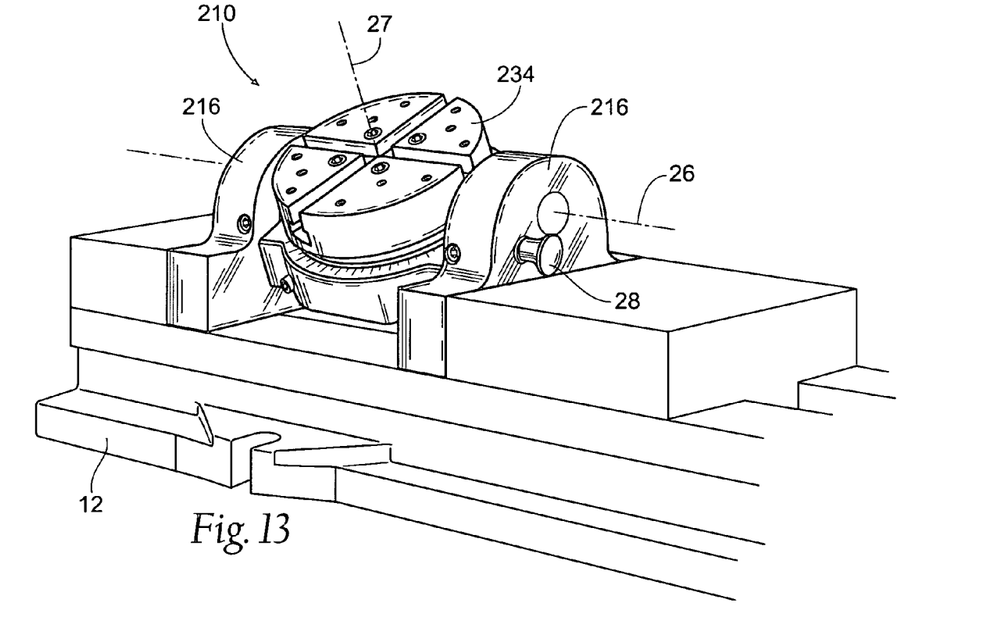
FIG. 13 is a perspective view of the embodiment of FIG. 11, with the rotatable collet holder holding an adaptor that can be used to hold in place various chucks of various size and arrangement.
Figure 14:
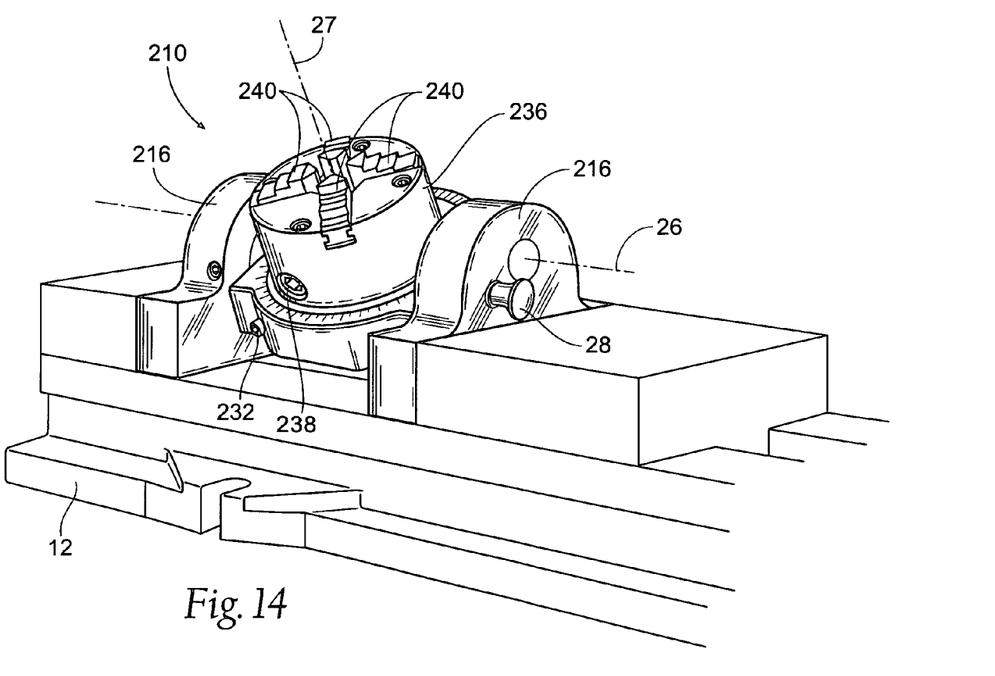
FIG. 14 is a perspective view of the embodiment of FIG. 11, with the rotatable collet holder holding a jaw chuck.
Figure 15:
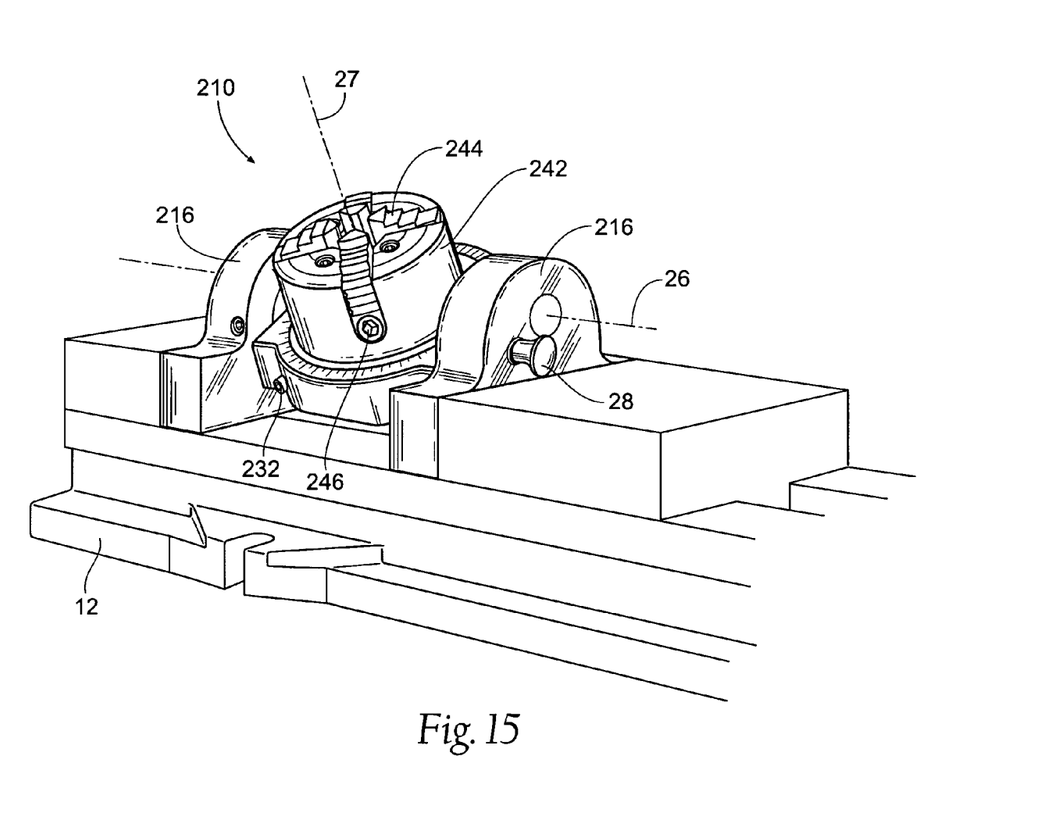
FIG. 15 is a perspective view of the embodiment of FIG. 11, with the rotatable collet holder holding an alternate jaw chuck.

FIGS. 13-15 further depict possible devices or tools that could be mounted upon the collet assembly 210. FIG. 13 shows an adaptor 234 being positioned on the inner section 222, with adaptor 234 being used for mating with other known tools or work pieces. FIG. 14 demonstrates a locking jaw 236 being positioned on the inner section 222. The locking jaw 236 has a tensioning screw 238 that will adjust the jaws 240 located on the locking jaw 236. A locking jaw 242 shown in FIG. 15 is similar to the locking jaw 236, except that each of the jaws 244 has an individual tensioning screw 246 for each of the individual jaws 244. The arrangements depicted in FIGS. 13-15 (or FIG. 12) demonstrate that the present invention is capable of being used and adapted for a wide range of tools and devices commonly used in the art.

Figure 16:
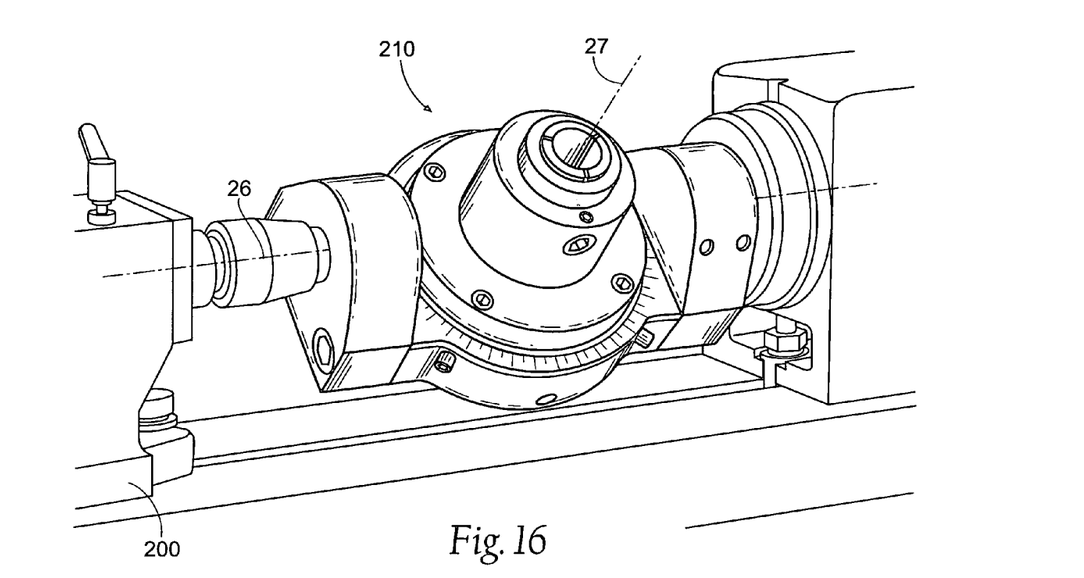
FIG. 16 is a perspective view of the embodiment of FIG. 11 being supported by an automatic index head, holding a collet chuck.
Figure 17:
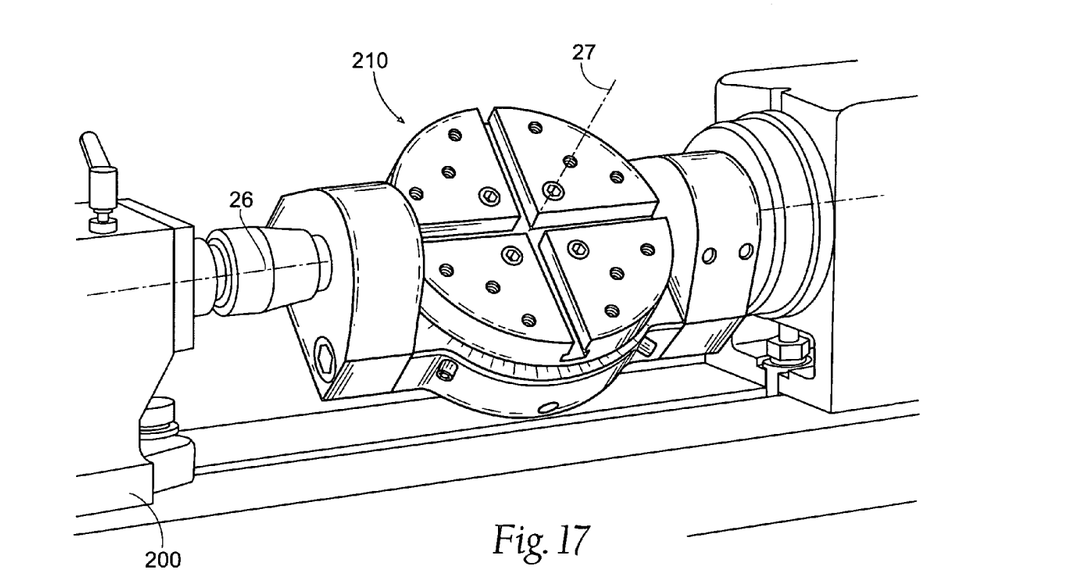
FIG. 17 is a perspective view of the embodiment of the rotatable collet holder of FIG. 16 holding an adaptor for various chucks.

FIGS. 16-17 further demonstrate the adaptability of the collet assembly 210. The collet assembly 210 is shown as being supported by an automatic index head 200, rather than the vise mount 12. The collet assembly 210 is still capable of rotation around both axis 26 and 27, as previously described, and the collet assembly 210 can be held in various positions, also. Furthermore, the mounting of the collet assembly 210 on the automatic index head 200 does not affect the ability of the assembly to be used for various tools and adaptors, such as the collet holder 20 (FIG. 16), the adaptor 234 (FIG. 17) or the locking jaws 236, 242 and other used tools.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

I claim:

1. A collet assembly for use on a support device, said collet assembly comprising:
   means for supporting said collet assembly on said support device, said support means comprising at least one support member being secured to said support device;
   a base section connected to said support member, said base section having a central axis, said base section being rotatable with respect to said support member, said base section being further rotatable with respect to said central axis;
   said base section being positionable at a plurality of positions with respect to said support member and to said central axis; and
   means for releasably locking said base section at one of said plurality of positions;
   wherein said releasably locking means comprises individual locking means for locking said base section with respect to said support member and for locking said base with respect to said central axis.

2. The assembly according to claim 1, wherein said support means further comprises a pair of support members, said support members being located on opposing sides of said base section, said support members being secured to said support device.

3. The assembly according to claim 1 wherein said base section further comprises an inner section and an outer section, said inner section being rotatable with respect to said outer section and said central axis.

4. The assembly according to claim 1, wherein said base section is capable of rotating at least approximately 180° with respect to said support means.

5. The assembly according to claim 4, wherein said base section is capable of rotating at least approximately 360° with respect to said support means.

6. The assembly according to claim 1 wherein said base section is capable of rotating at least 180° with respect to said central axis.

7. The assembly according to claim 6, wherein said base section is capable of rotating at least 360° with respect to said central axis.

8. A collet assembly for use on a support device, said collet assembly comprising:
   means for supporting said collet assembly on said support device, said support means comprising at least one support member being secured to said support device;
   a base section connected to said support member, said base section having a central axis, said base section being rotatable with respect to said support member, said base section being further rotatable with respect to said central axis;
   said base section being positionable at a plurality of positions with respect to said support member and to said central axis; and
   means for releasably locking said base section at one of said plurality of positions wherein said releasable locking means comprises a single locking means for locking said base section with respect to said support member and to said central axis.

9. A collet assembly for use on a support device, said collet assembly comprising:
   means for supporting said collet assembly on said support device said support means comprising at least one support member being secured to said support device:
   a base section connected to said support member, said base section havin a central axis said base section being rotatable with respect to said support member said base section being further rotatable with respect to said central axis;
   said base section being positionable at a plurality of positions with respect to said support member and to said central axis:
   said base section having means for receiving a work tool; and
   means for releasably locking said base section at one of said plurality of positions;
   wherein said releasably locking means comprises individual locking means for locking said base section with respect to said support member and said base with respect to said central axis.

10. The assembly according to claim 9, wherein said support means further comprises a pair of support members, said support members being located on opposing sides of said base section, said support members being secured to said support device.

11. The assembly according to claim 9 wherein said base section further comprises an inner section and an outer section, said inner section being rotatable with respect to said outer section and said central axis.

12. The assembly according to claim 9, wherein said base section is capable of rotating at least approximately 360° with respect to said support member.

13. The assembly according to claim 9 wherein said base section is capable of rotating at least 360° with respect to said central axis.

14. A collet assembly for use on a support device, said collet assembly comprising:
   means for supporting said collet assembly on said support device, said support means comprising at least one support member being secured to said support device;
   a base section connected to said support member, said base section having a central axis, said base section being rotatable with respect to said support member, said base section being further rotatable with respect to said central axis;
   said base section being positionable at a plurality of positions with respect to said support member and to said central axis;
   said base section having means for receiving a work tool; and
   means for releasably locking said base section at one of said plurality of positions;

wherein said releasable locking means comprises a single locking means for locking said base section with respect to said support member and said central axis.

15. A collet assembly for use on a support device, said collet assembly comprising:
   a pair of support members being secured to said support device:
   a base section having a central axis, said base section further comprising an inner section and an outer section said inner section being rotatable with respect to said outer section and said central axis;
   said base section being rotatable with respect to said support members;
   said support members being located on opposing sides of said base section;
   said base section being positionable at a plurality of positions with respect to said support member and to said central axis;
   said base section having means for receiving a work tool; and
   means for releasably locking said base section at one of said plurality of positions. wherein said base section is capable of rotating at least 360° with respect to said support members.

16. The device according to claim 15 wherein said inner section of said base section is capable of rotating at least 360° with respect to said central axis.

* * * * *